(12) United States Patent
McEntee et al.

(10) Patent No.: US 7,080,766 B2
(45) Date of Patent: Jul. 25, 2006

(54) MANUFACTURE OF SINGULATED SUPPORTS COMPRISING ARRAYS

(75) Inventors: John F. McEntee, Boulder Creek, CA (US); Alexander S. Williamson, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 246 days.

(21) Appl. No.: 10/186,448

(22) Filed: Jul. 1, 2002

(65) Prior Publication Data
US 2004/0000045 A1 Jan. 1, 2004

(51) Int. Cl.
*B26F 3/00* (2006.01)
*C03B 33/02* (2006.01)

(52) U.S. Cl. .................... 225/96.5; 225/104
(58) Field of Classification Search .......... 225/96.5, 225/104
See application file for complete search history.

(56) References Cited

U.S. PATENT DOCUMENTS

| | | | |
|---|---|---|---|
| 2,406,205 A * | 8/1946 | Ward et al. .............. 101/232 |
| 3,141,592 A | 7/1964 | Glynn et al. |
| 3,300,112 A | 1/1967 | Tailleur et al. |
| 3,372,847 A | 3/1968 | Walters et al. |
| 3,517,869 A * | 6/1970 | Dryon ............... 225/2 |
| 3,592,370 A | 7/1971 | Boardman |
| 3,608,146 A * | 9/1971 | Dunipace ............ 425/302.1 |
| 3,754,884 A | 8/1973 | McDavid et al. |
| 3,770,173 A * | 11/1973 | Carothers et al. ........ 225/2 |
| 3,779,437 A | 12/1973 | Yamamoto et al. |
| 3,875,766 A | 4/1975 | French |
| 3,930,825 A | 1/1976 | Chui |
| 4,076,159 A * | 2/1978 | Farragher ................ 225/3 |
| 4,088,255 A | 5/1978 | DeTorre |
| 4,109,841 A * | 8/1978 | DeTorre ............... 225/96.5 |
| 4,175,457 A * | 11/1979 | Jacobs et al. ............. 83/230 |
| 4,285,451 A * | 8/1981 | Ferraino ................. 225/2 |
| 4,306,672 A | 12/1981 | Johannes |
| 4,409,167 A | 10/1983 | Kolouch et al. |
| 4,454,972 A | 6/1984 | Maltby, Jr. et al. |
| 5,235,882 A * | 8/1993 | Rabourn ................ 83/76.1 |
| 5,529,564 A * | 6/1996 | Hediger ................. 493/413 |
| 5,673,837 A * | 10/1997 | Meschi .................. 225/100 |
| 5,871,134 A | 2/1999 | Komagata et al. |
| 6,098,861 A * | 8/2000 | Inoue ................... 225/96.5 |
| 6,140,044 A | 10/2000 | Besemer et al. |

* cited by examiner

*Primary Examiner*—Charles Goodman

(57) ABSTRACT

Apparatus and methods are disclosed for cutting a sheet of material into single supports where each of the single supports has an array area to which is bound an array of chemical compounds. The sheet comprises a plurality of score lines. The apparatus comprises an input conveyor, an output conveyor, a driver for moving the sheet from the input conveyor to the output conveyor and a breaking mechanism for breaking the sheet into single supports. The input conveyor, the output conveyor and the driver are each adapted to move the sheet without contacting the array area and an area on a surface of the support opposite the array area. Likewise, the breaking mechanism breaks the sheet into the single supports along the score lines without contacting the array area and an area on a surface of the support opposite the array area.

42 Claims, 3 Drawing Sheets

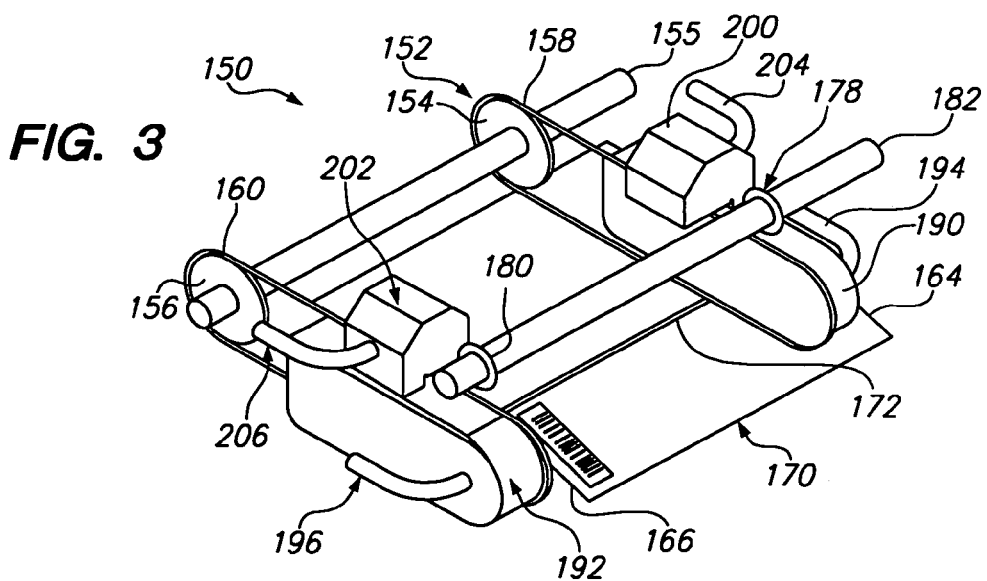
FIG. 3
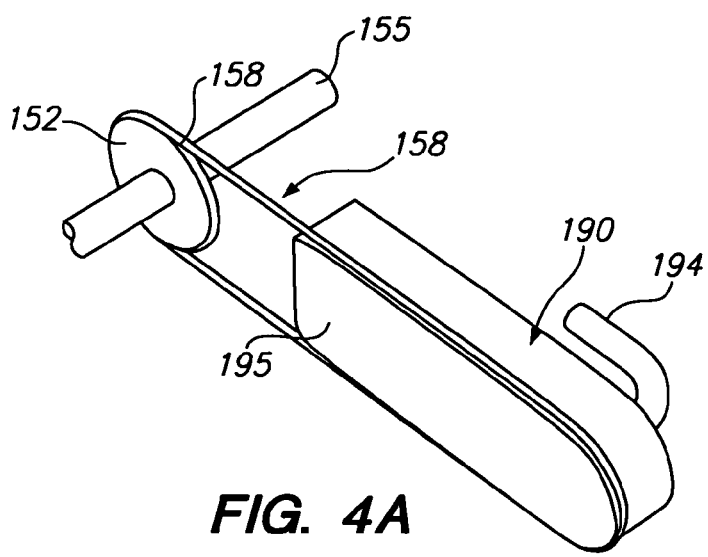
FIG. 4A
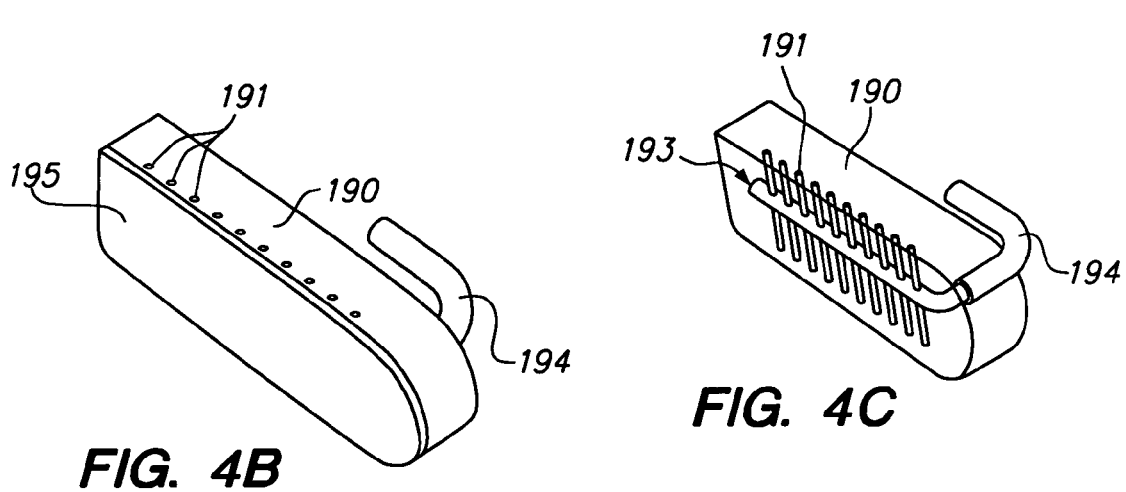
FIG. 4B
FIG. 4C

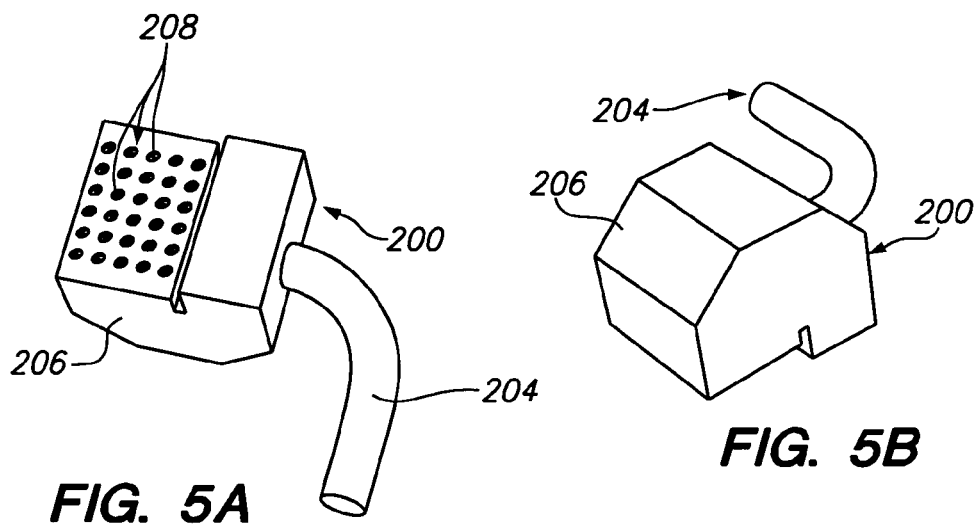
FIG. 5A
FIG. 5B
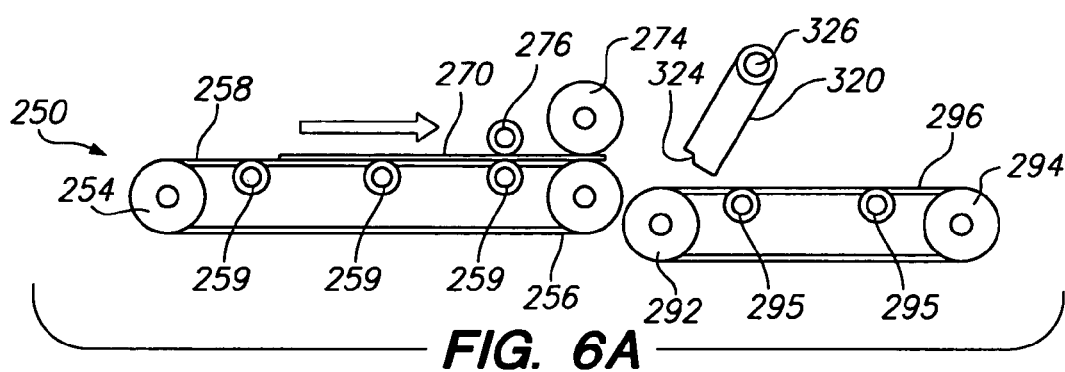
FIG. 6A
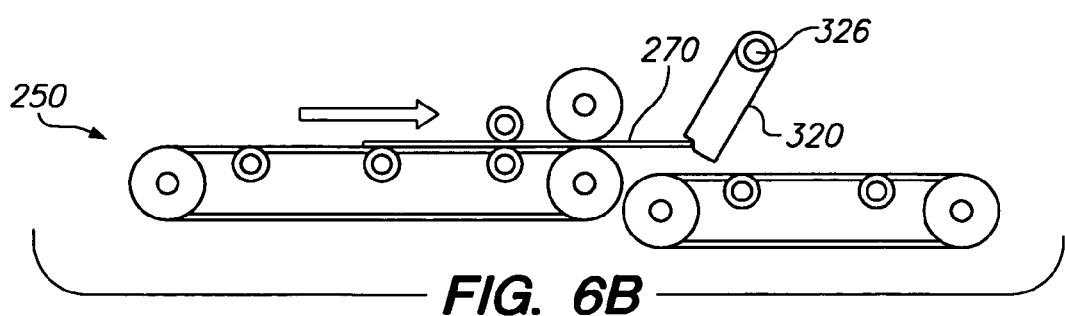
FIG. 6B
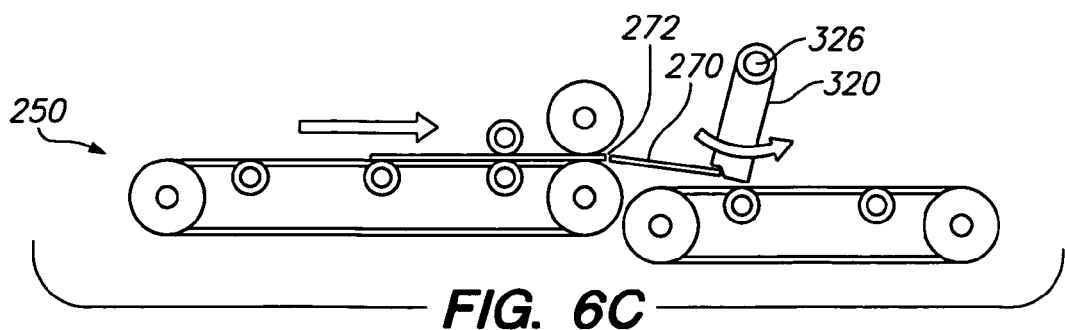
FIG. 6C

MANUFACTURE OF SINGULATED SUPPORTS COMPRISING ARRAYS

BACKGROUND OF THE INVENTION

This invention relates to the manufacture of supports having bound to the surfaces thereof a plurality of chemical compounds, such as biopolymers. In particular, the invention relates to cutting of sheets of material that comprise multiple supports into individual assay devices, each comprising a single support.

In the field of diagnostics and therapeutics, it is often useful to attach species to a surface. One important application is in solid phase chemical synthesis wherein initial derivatization of a substrate surface enables synthesis of polymers such as oligonucleotides and peptides on the substrate itself. Support bound oligomer arrays, particularly oligonucleotide arrays, may be used in screening studies for determination of binding affinity. Modification of surfaces for use in chemical synthesis has been described. See, for example, U.S. Pat. No. 5,624,711 (Sundberg), U.S. Pat. No. 5,266,222 (Willis) and U.S. Pat. No. 5,137,765 (Farnsworth).

Determining the nucleotide sequences and expression levels of nucleic acids (DNA and RNA) is critical to understanding the function and control of genes and their relationship, for example, to disease discovery and disease management. Analysis of genetic information plays a crucial role in biological experimentation. This has become especially true with regard to studies directed at understanding the fundamental genetic and environmental factors associated with disease and the effects of potential therapeutic agents on the cell. Such a determination permits the early detection of infectious organisms such as bacteria, viruses, etc.; genetic diseases such as sickle cell anemia; and various cancers. This paradigm shift has lead to an increasing need within the life science industries for more sensitive, more accurate and higher-throughput technologies for performing analysis on genetic material obtained from a variety of biological sources.

Unique or misexpressed nucleotide sequences in a polynucleotide can be detected by hybridization with a nucleotide multimer, or oligonucleotide, probe. Hybridization is based on complementary base pairing. When complementary single stranded nucleic acids are incubated together, the complementary base sequences pair to form double stranded hybrid molecules. These techniques rely upon the inherent ability of nucleic acids to form duplexes via hydrogen bonding according to Watson-Crick base-pairing rules. The ability of single stranded deoxyribonucleic acid (ssDNA) or ribonucleic acid (RNA) to form a hydrogen bonded structure with a complementary nucleic acid sequence has been employed as an analytical tool in molecular biology research. An oligonucleotide probe employed in the detection is selected with a nucleotide sequence complementary, usually exactly complementary, to the nucleotide sequence in the target nucleic acid. Following hybridization of the probe with the target nucleic acid, any oligonucleotide probe/nucleic acid hybrids that have formed are typically separated from unhybridized probe. The amount of oligonucleotide probe in either of the two separated media is then tested to provide a qualitative or quantitative measurement of the amount of target nucleic acid originally present.

Direct detection of labeled target nucleic acid hybridized to surface-bound polynucleotide probes is particularly advantageous if the surface contains a mosaic of different probes that are individually localized to discrete, and often known, areas of the surface. Such ordered arrays containing a large number of oligonucleotide probes have been developed as tools for high throughput analyses of genotype and gene expression. Oligonucleotides synthesized on a solid support recognize uniquely complementary nucleic acids by hybridization, and arrays can be designed to define specific target sequences, analyze gene expression patterns or identify specific allelic variations. The arrays may be used for conducting cell study, diagnosing disease, identifying gene expression, monitoring drug response, determination of viral load, identifying genetic polymorphisms, analyzing gene expression patterns or identifying specific allelic variations, and the like.

In one approach, cell matter is lysed, to release its DNA as fragments, which are then separated out by electrophoresis or other means, and then tagged with a fluorescent or other label. The resulting DNA mix is exposed to an array of oligonucleotide probes, whereupon selective binding to matching probe sites takes place. The array is then washed and interrogated to determine the extent of hybridization reactions. In one approach the array is imaged so as to reveal for analysis and interpretation the sites where binding has occurred. Arrays of different chemical compounds or moieties or probe species provide methods of highly parallel detection, and hence improved speed and efficiency, in assays. Assuming that the different sequence polynucleotides were correctly deposited in accordance with the predetermined configuration, then the observed binding is indicative of the presence and/or concentration of one or more polynucleotide components of the sample.

The arrays may be microarrays created on the surface of a support by in situ synthesis of biopolymers such as polynucleotides, polypeptides, polysaccharides, etc., and combinations thereof, or by deposition of molecules such as oligonucleotides, cDNA and so forth. In general, arrays are synthesized on a surface of a support or substrate by one of any number of synthetic techniques that are known in the art. In one approach, for example, the support may be one on which a single array of chemical compounds is synthesized. Alternatively, multiple arrays of chemical compounds may be synthesized on the support, which is then diced, i.e., cut, into individual assay devices, which are supports that each comprise a single array, or in some instances multiple arrays, on a surface of the support.

Brittle materials such as glass are often cut into individual pieces by using a technique wherein the sheet of material is scored transversely to produce a crack and, then, the sheet is mechanically stressed in such a manner that strips are broken from the sheet along the score lines. This process is sometimes referred to as the "scribe and break" method. The mechanical stressing may be accomplished in a number of known ways. Generally, the scored material is placed in three or four point bending in the scored area. The sheet is flexed such that the scored side of the material is put in tension, thus, propagating the crack through the material. The process has been automated. Cutting lines are provided on the surface of the glass sheet by, for example, a cutter. Push rollers are applied to the parts just outside the cutting lines and support rollers are applied to the back of the glass sheet and at the parts just inside the cutting lines. Force is applied to the glass by means of the push rollers to bend and break the glass sheet along the cutting lines. In a conventional glass cutting apparatus a roller conveyor is provided on a stationary frame and push rollers for breaking off the sheet glass and support rollers are also mounted on the frame.

The common methods of breaking sheet materials into pieces of predetermined size have difficulties when applied to supports that have chemical compounds on their surfaces, particularly, biopolymers in the form of arrays. When the process is performed automatically, it involves fixing the material in a tool where force is applied to both sides of the score or scribe on the material while a reaction force is applied to the area of the score from the unscored side or surface. The method requires the material to be moved into position, fixed in position, broken and then removed from the cutting area. Another problem with the common methods is control of the single cut pieces. Where the pieces do not have identical chemical or biological coatings, they must be handled in such a way to assure that the identity of the single pieces is not lost. Furthermore, most breaking operations are not suitable for handling and snapping the brittle material without touching the surfaces of the material. When the surfaces contain fragile coatings such as arrays of chemical compounds, contamination of and/or damage to the surface of the supports can occur.

There is, therefore, a need for methods and apparatus for cutting sheets of brittle material into single pieces where the surface of the sheets comprises multiple arrays of chemical compounds. The methods and apparatus should permit continuous, high speed processing and provide control of the single pieces cut from the sheet.

SUMMARY OF THE INVENTION

One embodiment of present invention is an apparatus for cutting a sheet of material into single supports where each of the single supports has an array area to which is bound an array of chemical compounds. The sheet comprises a plurality of score lines. The apparatus comprises an input conveyor, an output conveyor, a driver for moving the sheet from the input conveyor to the output conveyor and a breaking mechanism for breaking the sheet into single supports. The input conveyor, the output conveyor and the driver are each adapted to move the sheet without contacting the array area and an area on a surface of the support opposite the array area. Likewise, the breaking mechanism breaks the sheet into the single supports along the score lines without contacting the array area and an area on a surface of the support opposite the array area.

Another embodiment of the present invention is an apparatus for cutting a sheet of material into single supports. Each of the single supports has an array area on a surface of the support, to which array area is bound an array of biopolymers. The sheet comprises a plurality of score lines. The apparatus comprises an input conveyor comprising a pair of belts, an output conveyor comprising a pair of belts, a drive roller, a pinch roller, a breaking roller and a reaction roller. The drive roller and the pinch roller cooperate to move the sheet from the input conveyor to the output conveyor. The breaking roller and the reaction roller cooperate to break the sheet along the score lines into the single supports. The input conveyor, the output conveyor, the drive roller, the pinch roller, the breaking roller and the reaction roller each contact only opposing longitudinal perimeter edges of a surface of the sheet. Furthermore, the output conveyor and the breaking roller each contact only opposing longitudinal perimeter edges of a surface of the single supports.

Another embodiment of the present invention is an apparatus for cutting a sheet of material into single supports. Each of the single supports has an array area to which is bound an array of chemical compounds and the sheet comprises a plurality of score line. The apparatus comprises means for moving the sheet, without contacting the array area and an area on a surface of the support opposite the array area, into position for breaking the sheet along the score lines, and means for breaking the sheets along the score lines to form the single supports without contacting the array area and an area on a surface of the support opposite the array area.

Another embodiment of the present invention is a method for cutting a sheet of material into single supports where each of the single supports has at least one array area to which is bound an array of chemical compounds. The sheet comprises a plurality of score lines. In the method the sheet is moved without contacting the array area and an area on a surface of the support opposite the array area. The sheet is moved into position for breaking the sheet along the score lines. The sheets are broken along the score lines to form the single supports without contacting the array area and an area on a surface of the support opposite the array area.

Another embodiment of the present invention is a method for synthesizing an array of biopolymers on a surface of a support. The method comprises multiple rounds of subunit additions. In each round of subunit addition, one or more polymer subunits are added at each of multiple feature locations on sections of the sheet to form multiple arrays on each of the sections. The sections are divided by score lines. Each round of subunit additions comprises (i) introducing the support into the reaction chamber, (ii) bringing the support and a dispensing system for dispensing the polymer subunits for synthesis of the biopolymers into a dispensing position relative to the activated discrete sites on the surface, (iii) dispensing the polymer subunits to the discrete sites, and (iv) removing the support and/or the dispensing system from the relative dispensing position. The sheet is moved, without contacting the array area and an area on a surface of the support opposite the array area, into position for breaking the sheet along the score lines. The sheets are broken along the score lines to form the single supports without contacting the array area and an area on a surface of the support opposite the array area.

BRIEF DESCRIPTION OF THE DRAWINGS

FIG. 3 is a schematic depiction of an alternate embodiment of an apparatus in accordance with the present invention wherein air bearings are used for conveying and reaction forces.

FIG. 4A is a schematic depiction of the input conveyor air bearing guide used in the apparatus of FIG. 3.

FIG. 4B is a schematic depiction of the input conveyor air bearing guide of FIG. 4A without the conveyor belt and roller.

FIG. 4C is a schematic depiction of the input conveyor air bearing guide of FIG. 4B showing an internal distribution manifold.

FIG. 5A is a schematic depiction of a top view of an air bearing used in the apparatus of FIG. 3.

FIG. 5B is a schematic depiction of a bottom view of the air bearing of FIG. 5A.

FIG. 6A is a schematic diagram of an alternate embodiment of an apparatus in accordance with the present invention employing a breaking lever and shown in one phase of operation.

FIG. 6B is a schematic diagram of the apparatus of FIG. 6A shown in another phase of operation.

FIG. 6C is a schematic diagram of the apparatus of FIG. 6A shown in another phase of operation.

DETAILED DESCRIPTION OF THE INVENTION

Figure 1:
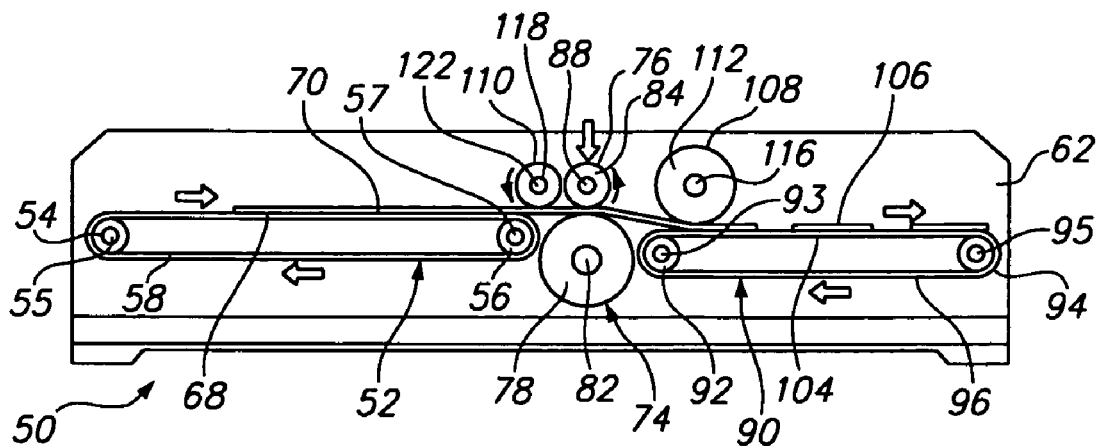
FIG. 1 is a schematic diagram depicting a top view of one embodiment of an apparatus in accordance with the present invention.

In its broadest aspect the present invention provides apparatus and methods for cutting sheets of scored brittle materials, for example, sheets of glass, into single sections. The sheets have a plurality of chemical compounds on an area of at least one surface of the sheets. Usually, the chemical compounds are arranged to form an array on each of the sections that will be broken to provide the single sections or supports, each comprising an array of chemical compounds. The apparatus operates to move the sheets and break the sheets, and further to move the single sections away from the breaking mechanism. All of the above steps are carried out without contacting the sheets or the single sections at areas where the arrays of chemical compounds are present. Furthermore, no contact is made with an area on the opposing surface, that is, the area on the surface opposite the area of the surface on which the chemical compounds are found. In this manner, the chemical compounds of the arrays remain intact during the breaking operation. Furthermore, as a result of the present apparatus and methods, the area on the opposing surface is not contaminated with materials that might interfere with the use of the arrays to conduct assays particularly where such use involves reading a signal from the array area on the surface of the single sections.

The brittle materials should be brittle enough such that they may be broken along score lines into individual sections. Usually, the brittle materials are rigid to the extent that the above breaking may occur. The scored edge along the break line should be relatively smooth although smoothness is not a critical feature. The edge along the break should not be jagged to the extent that the sections may not be employed for their intended purpose. In any event, the break along the score lines should not significantly interfere with the array area or the area on the opposing surface of the section opposite the array area. The scribe lines should be straight to the extent necessary to assure reliable breaking. The snapper functions by putting the substrate in bending, producing tensile stress across the scribe, thus propagating the scribe-initiated fracture through the substrate's thickness. The scribe line must be of sufficient depth to produce reliable breaks; usually, the depth of the scribe line is about 100 to about 500 microns, preferably, about 150 to about 250 microns. The scribed edges are commonly produced in regions at least about 0.5 millimeters from the array area or active area and, preferably, at least about 1.5 millimeters in order to prevent damage to the active area surface.

Preferred materials for the sheet are those that provide physical support for the chemical compounds that are deposited on the surface or synthesized on the surface in situ from subunits. The brittle materials should be of such a composition that they endure the conditions of a deposition process and/or an in situ synthesis and of any subsequent treatment or handling or processing that may be encountered in the use of the particular array.

Typically, the support material is transparent. By "transparent" is meant that the support material permits signal from features on the surface of the support to pass therethrough without substantial attenuation and also permits any interrogating radiation to pass therethrough without substantial attenuation. By "without substantial attenuation" may include, for example, without a loss of more than 40% or more preferably without a loss of more than 30%, 20% or 10%, of signal. The interrogating radiation and signal may for example be visible, ultraviolet or infrared light. In certain embodiments, such as for example where production of binding pair arrays for use in research and related applications is desired, the materials from which the substrate may be fabricated should ideally exhibit a low level of non-specific binding during hybridization events. However, it should be noted that the nature of the transparency of the substrate is somewhat dependent on the nature of the scanner employed to read the substrate surface. Some scanners work with opaque or reflective substrates.

The brittle materials may be naturally occurring or synthetic or modified naturally occurring. Suitable rigid substrates may include glass, which term is used to include silica, and include, for example, glass such as glass available as Bioglass, and suitable plastics. Should a front array location be used, additional rigid, non-transparent materials may be considered, such as silicon, mirrored surfaces, laminates, ceramics, opaque plastics, such as, for example, polymers such as, e.g., poly (vinyl chloride), polyacrylamide, polyacrylate, polyethylene, polypropylene, poly(4-methylbutene), polystyrene, polymethacrylate, poly(ethylene terephthalate), nylon, poly(vinyl butyrate), etc., either used by themselves or in conjunction with other materials. The surface of the support is usually the outer portion of a support.

The surface of the material onto which the chemical compounds are deposited or formed may be smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethylene amines, polyarylene sulfides, polysiloxanes, polyimides, polyacetates, and the like, where the polymers may be hetero- or homo-polymeric, and may or may not have separate functional moieties attached thereto (for example, conjugated). Various further modifications to the particular embodiments described above are, of course, possible. Accordingly, the present invention is not limited to the particular embodiments described in detail above.

The brittle material used for an array support or substrate may take any of a variety of configurations ranging from simple to complex. Usually, the material is relatively planar such as, for example, a slide. In many embodiments, the material is shaped generally as a rectangular solid. As mentioned above, multiple arrays of chemical compounds are synthesized on a sheet, which is then singulated, i.e., cut by breaking along score lines, into single array supports. For this purpose the sheet of brittle material is usually about 5 to about 13 inches in length and about 5 to about 13 inches in width so that the support may be diced into multiple single array supports having the dimensions indicated below. In a specific embodiment by way of illustration and not limitation, a wafer that is 6⅝ inches by 6 inches is employed and diced into one inch by 3 inch slides.

The individual or single support is the section of the sheet that is produced by breaking the sheet along the predetermined score lines. The individual support may have a single array, or multiple arrays, of chemical compounds synthesized or deposited on a surface thereof. The dimensions of the individual support is normally determined by the intended use of the support, usually, in conducting assays involving the chemical compounds on the surface of the support. Typically, the support has a length in the range about 5 mm to 100 mm, usually about 20 mm to 76 mm, more usually about 75 mm to 76 mm, and a width in the range about 5 mm to 52 mm, usually about 5 mm to 26 mm and more usually about 25 mm to 26 mm. The support may have a thickness of less than 1 cm, or even less than 5 mm, 2 mm, 1 mm, or in some embodiments even less than 0.5 mm or 0.2 mm. The thickness of the support is about 0.01 mm to 5.0 mm, usually from about 0.1 mm to 2 mm and more usually from about 0.2 to 1 mm. A standard size microscope slide is usually about 3 inches in length and 1 inch in width.

As mentioned above, the sheet of brittle material comprises score lines along which the sheet is broken to provide individual or single sections or supports. To score the material, the sheet of material is subjected to a procedure in which minute fissures or cracks are propagated into the body of the sheet usually to a depth sufficient to obtain a clean break. However, the score line should not be so deep that there is a risk of the sheet of material breaking during various steps of the synthesis and handling of the support. The depth of the fissures depends on the type of material and the thickness of that material. Usually, for glass this depth is about 100 to about 500 microns, more usually, about 150 to about 250 microns. Any cutter or cutting means may be employed that can provide the score lines in the longitudinal direction at predetermined positions along the sheet of material. For example, the sheet may be scored using a conventional diamond or tungsten carbide wheel, which is drawn across the surface of the sheet to form score lines. Other examples of ways in which the sheet may be scored include laser scribing, laser ablation, laser perforation, water jet ablation, and the like. The sheet of brittle material is usually scored after depositing and/or synthesizing chemical compounds in the form of arrays on the surface of the sheet although scoring before such deposition or synthesis may be employed in some instances.

Any of a variety of geometries of arrays on a support may be used. As mentioned above, an individual support may contain a single array or multiple arrays. Features of the array may be arranged in rectilinear rows and columns. This is particularly attractive for single arrays on a support. When multiple arrays are present, such arrays can be arranged, for example, in a sequence of curvilinear rows across the substrate surface (for instance, a sequence of concentric circles or semi-circles of spots), and the like. Similarly, the pattern of features may be varied from the rectilinear rows and columns of spots to include, for example, a sequence of curvilinear rows across the support surface (for example, a sequence of concentric circles or semi-circles of spots), and the like. The configuration of the arrays and their features may be selected according to manufacturing, handling, and use considerations.

Regardless of the geometry of the array or arrays on the surface of an individual support or on the surface of a sheet comprising a multiple of individual supports, the arrays normally do not comprise the entire surface of the sheet or of the support. For sheets of material comprising a multiple of individual supports, the sheet typically has a border along its longitudinal edges that is about 0.5 to about 3 mm wide, usually, about 1 to about 2 mm wide. It follows, therefore, that the border of the individual supports obtained from the sheet would be the same as that for the sheet.

As mentioned above, an apparatus in accordance with the present invention for cutting sheets of material comprising arrays of chemical compounds comprises means for moving the sheet, without contacting the array area and an area on a surface of the support opposite the array area, into position for breaking the sheet along the score lines, and means for breaking the sheets along the score lines to form the single supports without contacting the array area and an area on a surface of the support opposite the array area. In one embodiment the means for moving the sheet generally comprises an input conveyor, an output conveyor, and a drive mechanism. The input conveyor may comprise at least one roller, usually, at least two rollers adapted such that they do not contact the sheet of material in the array areas or areas on a surface of the sheet that oppose the array areas. Preferably, at least two rollers are employed in conjunction with two conveyor belts, which run longitudinally, one on each side of the pair of rollers.

The input conveyor belts are designed to contact only the perimeter longitudinal edges of the sheet surface, usually, the surface that is opposite to the surface on which the arrays are present. For purposes of this description, the surface that comprises the arrays is referred to arbitrarily as the top surface and the opposing surface is referred to as the bottom surface. Accordingly, in this embodiment of the input conveyor, the conveyor belts contact only the perimeter longitudinal edges of the bottom surface of the sheet. These edges correspond to the border on the top side of the sheet that surrounds the array area and on which no features of the array are present. The width of the contact area of each of the conveyor belts with a respective edge of the bottom surface is no greater than the border of the sheet that surrounds the array area. Usually, the contact area extends inwardly from the edges of the sheet at a width that is less than about 80% of the width of the border, more usually, less than about 50% of the width of the border. The entire width of the conveyor belts may be larger than the width of the border provided that the contact area is within the above parameters. In other words the outer edge of the conveyor belt need not necessarily coincide, i.e., be co-terminal, with the outer edge of the sheet of material as long as the contact area does not intrude into the array area or the opposing area. The important feature is that the inner edge of the conveyor does not contact any area on either of the opposing surfaces of the sheet where the area comprises, or opposes such area that comprises, any of the members of an array of chemical compounds. In that regard the inner edge should not be within about 0.5 mm, usually not within about 1, of the edge of an array area or edge of an opposing area.

The conveyor belts may comprise or be fabricated from a material of strength sufficient to achieve the intended purpose. Usually, the material provides a surface that will engage the edges of the sheet sufficiently to move the sheets. To this end the material must have sufficient friction with the substrate material to feed the support strips through the breaking apparatus. Suitable materials include, by way of illustration and not limitation, elastomeric materials such as, e.g., rubber, urethanes, nitrites, silicones, and the like.

The rollers that drive the conveyor belts are conventional in the art with the exception that they are adapted to drive the relatively narrow, axially spaced conveyor belts employed in the present invention. Usually, two sets of rollers are employed for each input conveyor although additional sets may also be included as needed or under appropriate circumstances. Each set of rollers normally comprises a pair of rollers usually mounted on an axle or mounted on separate axles. When drive rollers are mounted on separate axles, additional mechanisms are required so that the wheels rotate together such as a drive train, gearbox or synchronized motors. The rollers are usually axially spaced with the rollers at or near a respective terminus of the axle. The axles employed are conventional in the art and must not touch any surface of the sheet of brittle material in an area in which chemical compounds are located or any surface opposite such an area. The rollers may be rotatably mounted on the axles and driven by a motor in a controlled fashion. In one approach a belt is employed to connect the motor to at least one member of the pair of rollers using, for example, suitable pulley devices. The motor may be mounted on a frame, on which the input conveyor is also mounted. Alternatively, the rollers may be fixedly attached to the axle, which is rotatably mounted on the frame. The axle may be driven by a motor in a manner similar to that discussed above for the rotatable rollers.

The length of the axle is usually determined by the width of the sheet of material to be broken. Sometimes it is desirable to make the apparatus adjustable so that different widths of the material can be snapped. In this case the drive axles would be keyed or have splines so that the distance between the wheels at the edges of the substrate strips can vary as the distance between the guide rails is adjusted. Another means of accomplishing this is for the wheels to be mounted on separate axles and the two sides driven separately. The size of the rollers is determined by the particular application. The width of the rollers where the roller contacts the conveyor belts is usually at least as wide as the conveyor belt driven by the roller. As a general rule, the width of the rollers is about 0.5 to about 2 times the width of the conveyor belt, usually, about 1.0 to about 1.5 times the width of the conveyor belt. The diameter of the rollers varies with application but is about 5 mm to about 60 mm, usually about 7 mm to 25 mm.

The frame of the apparatus is generally constructed from a suitable material that gives structural strength and stiffness to the apparatus so that various moving parts may be employed in conjunction with the apparatus. Such materials include, for example, metal, plastic, glass, lightweight composites, and the like.

The design of the output conveyor may be, and usually is, similar to that described above for the input conveyor. One significant difference between the output conveyor and the input conveyor is the speed at which the conveyors are driven. In one approach the output conveyor is operated at a speed that is greater than that of the input conveyor. In this way individual or singulated sections of the sheet of material are separated from the breaking point and from one another as they are removed from the breaking process.

The mechanism for moving the sheet of material for breaking along score lines may also comprise a drive roller and a pinch roller. The drive roller comprises a pair of axially spaced rollers mounted rotatably on a suitable axle. The width of the rollers of the drive roller where the roller contacts the sheet of brittle material is determined by the width of the border of the sheet, i.e., the edge of the sheet that does not comprise any of the arrays of the chemical compounds. The dimensions of the border of the sheet are discussed more fully above. Usually, the contact area, that is, the area that roller contacts the sheet, extends inwardly from the edges of the sheet at a width that is less than about 80% of the width of the border, more usually, less than about 50% of the width of the border. The entire width of the roller contact area may be larger than the width of the border provided that the contact area is within the above parameters. In other words the outer edge of the roller need not necessarily coincide, i.e., be co-terminal, with the outer edge of the sheet of material as long as the contact area does not intrude into the array area or the opposing area of the sheet of material. As with the input conveyor, the important feature for the drive rollers is that the inner edge thereof does not contact any area on either of the opposing surfaces of the sheet where the area comprises, or opposes such area that comprises, any of the members of an array of chemical compounds. In that regard the inner edge of the drive roller's contact area should not be within about 0.5 mm, usually not within about 1 mm, of the edge of an array area or edge of an opposing area. The diameter of the drive roller is usually about 5 to about 75 mm, more usually, about 10 to about 38 mm. The pinch roller is similar to drive roller and may be driven or may be passive, i.e., it may freely rotate, as the application requires. If the pinch roller is driven, the substrate can be fed through the apparatus with greater force because there is more driven contact area (top and bottom) and, thus, more frictional coupling with the substrate. The surface speed of the drive roller and the pinch roller is substantially the same as the surface speed of the input conveyor. This means that the speeds are usually the same or that they may vary by no more than about 2%, usually, no more than about 0.5%. In general, the speed of the input conveyor is about 1 to about 250 mm per second, usually, about 5 to about 50 mm per second.

In an alternative embodiment, instead of the rollers for the conveyor belts of the input conveyor, air bearings may be employed to move the conveyor belts. In general, an air cushion or air bearing is maintained between the belt support and the belt. Pressurized air or other suitable fluid is directed at the underside of the belt to form an air bearing. In a preferred mode, the thickness of the air bearing is less than about 0.005 inches, preferably less than about 0.002 inches, and more preferably between about 0.0005 and about 0.002 inches. More specifically, air or any pressurizable fluid is pumped into an air bearing space by any air-moving device such as, for example, a simple air compressor. In one approach air escapes through a series of orifices at or near the longitudinal axis of the conveyor belt. The air spreads out width-wise and lifts the belt off surface of the guide, thus reducing the friction between the moving belt and the stationary guide without the use of rollers and mechanical bearings. At the same time, the belt is propelled by a conventional drive system (see FIG. 3). Air escapes along the belt side edges and at the entrance and exit ends of the conveyor. The air bearing in the conveyor guide is composed of a longitudinal groove, used to guide the belt, and a series of small nozzles fed from an air manifold in the guide block (see FIG. 4) The belt, thus, is feed through the groove with very low friction.

Air bearings may be employed to hold the sheet against the drive roller as an alternative to a pinch roller. This may be explained more fully as follows. The substrate strip is moved on the input conveyor by the conveyor belt. A drive wheel is positioned over the conveyor belt to drive the substrate forward. The combination of substrate strip being pinched between the conveyor belt and the drive wheel provides the same function as the drive wheel and pinch wheel combination in the previous embodiment (see FIG. 3).

The apparatus of the present invention further comprises means for breaking the sheets along the score lines to form the single sections or supports without contacting the array area and/or an area on a surface of the support opposite the array area. One such means comprises a breaking mechanism for breaking the sheet of material along the score lines. The breaking mechanism may take any form as long as there is no contact between the breaking mechanism and the assay areas or the opposing areas of the sheet of material, or of the individual sections that are broken from the sheet. In one embodiment the breaking mechanism comprises a breaking roller and a reaction roller. The breaking roller is situated adjacent the drive roller and the pinch roller and the output conveyor on the downstream side of the direction of travel of the sheet of material, that is, in the direction of the movement of the sheet of material from the input conveyor to the output conveyor. The breaking roller forces a portion of the sheet of material near a score line to bend down. The reaction roller is positioned adjacent the drive roller and the pinch roller and adjacent the input conveyor on the upstream side of the direction of travel. The forward moving sheet must bend down under the breaking roller causing it to snap along the score line. The reaction roller prevents the sheet of material from lifting up in reaction to the action of the breaking roller.

The design of the breaking roller and the reaction roller is similar in many respects to that for the drive roller and the pinch roller. The breaking roller may comprise a pair of axially spaced rollers mounted rotatably on a suitable axle or fixedly attached to the axle, which is rotatably mounted in a frame. The width of the rollers of the breaking roller where the roller contacts the sheet of brittle material is determined by the width of the border of the sheet, i.e., the edge of the sheet that does not comprise any of the chemical compounds in an array. The dimensions of the border of the sheet are discussed more fully above. Usually, the contact area, that is, the area that the roller contacts the sheet, extends inwardly from the edges of the sheet at a width that is less than about 80% of the width of the border, more usually, less than about 50% of the width of the border. The entire width of the roller contact area may be larger than the width of the border provided that the contact area is within the above parameters. In other words the outer edge of the roller need not necessarily coincide, i.e., be co-terminal, with the outer edge of the sheet of material as long as the contact area does not intrude into the array area or the opposing area of the sheet of material. As with the drive roller, the inner edge of the breaking rollers should not be within about 0.5 mm, usually not within about 1 mm, of the edge of an array area or edge of an opposing area The diameter of the rollers of the breaking roller is usually about 5 to about 40 mm, more usually, about 10 to about 25 mm. The reaction roller is similar to the breaking roller with the exception that the reaction roller usually has a diameter that is smaller than that of the breaking roller. The reaction roller is usually about the same size as the drive roller.

The breaking roller may be rotated at a surface speed greater than the drive roller or it may be driven to substantially match the surface speed of the drive roller. When the breaking roller rotates at a faster surface velocity than the substrate moved by the drive roller, it creates a pulling effect on the material while applying the bending moment. In some applications, this can create better breaks. In other applications it may be advantageous to match the surface speeds of the drive roller and the breaking roller. As explained above, this means that the speeds are usually the same or that they may vary by the inverse ratio of their diameters. A roller twice as large would be driven half as fast so that the surface speeds matched. Alternatively, the breaking roller may be passive, i.e., it may freely rotate. In one approach the rollers of the breaking roller are mounted on the axle on bearings, which permit free rotation. In this situation the breaking roller rotates only when the sheet of brittle material contacts it. The pressure exerted by the breaking roller depends on the parameters for the score line. In general, the deeper the score line, the less is pressure needed to cause the breaking along such score line. Usually, the pressure required is about 0.1 to about 5 pounds per inch (linear force), more usually, about 0.5 to about 1 pounds per inch. The parameters for the action of the reaction roller are dependent on those of the breaking roller. In general, the reaction roller is adjusted to counteract the forces created by the breaking roller so that the section that is being broken from the sheet is put in three-point bending, thus applying the breaking force on the scribe line.

In an alternative embodiment of the breaking mechanism a lever may be employed. The lever may be passively or actively pivoted from a centerline and angled to contact the sheet of material in a manner similar to the contact between a breaking roller and the sheet of material. After each break, the lever returns to the initial position. This may be accomplished by employing a return spring and mechanical stop. Alternatively, a motor and control system may be used where the material edge is detected and the lever is rotated to follow this edge until the break occurs. The lever is then returned to its initial position awaiting the new material edge (see FIG. 6). A sensing mechanism may be employed to activate the lever when the next score line on the sheet of material is in position to allow breaking of the sheet along the score line. Any glass sensing device may be employed, such as led, laser or ultrasonic sensors. If the material is transparent, the material can be sensed by a reflection off its surface. The pressure exerted by the breaking lever is similar to that described above for the breaking roller.

Air bearings may also be employed in place of the reaction roller to prevent the sheet from lifting up in reaction to the action of a breaking roller. This may be explained more fully as follows. The reaction air bearing has an array of small nozzles on a flat surface (see FIG. 5). Because this air bearing doesn't actually touch the substrate surface at any time, the reaction air bearing can apply force over the active surface of the arrays without actually touching the surface. In addition, unlike a wheel that has a point contact, the air bearing can apply reaction force over a larger surface. This makes higher reaction forces possible, thus, stabilizing the breaking process.

As mentioned above, the apparatus and the methods in accordance with the present invention may be automated. To this end the apparatus of the invention further comprises appropriate motors and electrical and mechanical architecture and electrical connections, wiring and devices such as timers, clocks, computers and so forth for operating the various elements of the apparatus. Such architecture is familiar to those skilled in the art and will not be discussed in more detail herein.

To assist in the automation of the present process, the functions and methods may be carried out under computer control, that is, with the aid of a computer. For example, an IBM® compatible personal computer (PC) or a PLC (Programmable Logic Controller) or a combination of both may be utilized. The computer is driven by software specific to the methods described herein. Preferably, a PLC is employed.

Software that may be used to carry out the methods may be, for example, Microsoft Excel or Microsoft Access, suitably extended via user-written functions and templates, and linked when necessary to stand-alone programs that perform other functions. Examples of software or computer programs used in assisting in conducting the present methods may be written, preferably, in Visual BASIC, FORTRAN and C++, State language, or ladder logic. It should be understood that the above computer information and the software used herein are by way of example and not limitation. The present methods may be adapted to other computers and software. Other languages that may be used include, for example, PASCAL, PERL, FORTH or assembly language.

An example of an embodiment of the present invention is depicted in FIG. 1. As a general note, figures are not to scale and some elements of the figures may be accentuated for purposes of illustration. Apparatus 50 comprises input conveyor 52 comprising a pair of rollers 54 and 56 and conveyor belts 58 and 60. Rollers 54 and 56 are mounted on frame 62 by means of axles 55 and 57, respectively. As can be seen, conveyor belts 58 and 60 are designed so that each engages only respective perimeter edges 64 and 66 of bottom side 68 of sheet of glass 70 having a plurality of score lines 72. Apparatus 50 also comprises drive roller 74 and pinch roller 76. Drive roller 74 comprises a pair of axially spaced rollers 78 and 80 rotatably mounted on axle 82, which is also mounted on frame 62. Pinch roller 76 comprises a pair of axially spaced rollers 84 and 86 rotatably mounted on axle 88, which is also mounted on frame 62. Apparatus 50 comprises output conveyor 90 comprising a pair of rollers 92 and 94 and conveyor belts 96 and 98. Rollers 92 and 94 are mounted on frame 62 by means of axles 93 and 95, respectively. As can be seen, conveyor belts 96 and 98 are designed so that each engages only respective perimeter edges 100 and 102 of bottom side 104 of single sections or supports 106. Apparatus 50 also comprises breaking roller 108 and reaction roller 110. Breaking roller 108 comprises a pair of axially spaced rollers 112 and 114 rotatably mounted on axle 116, which is also mounted on frame 62. Reaction roller 110 comprises a pair of axially spaced rollers 118 and 120 rotatably mounted on axle 122, which is also mounted on frame 62.

Figure 2:
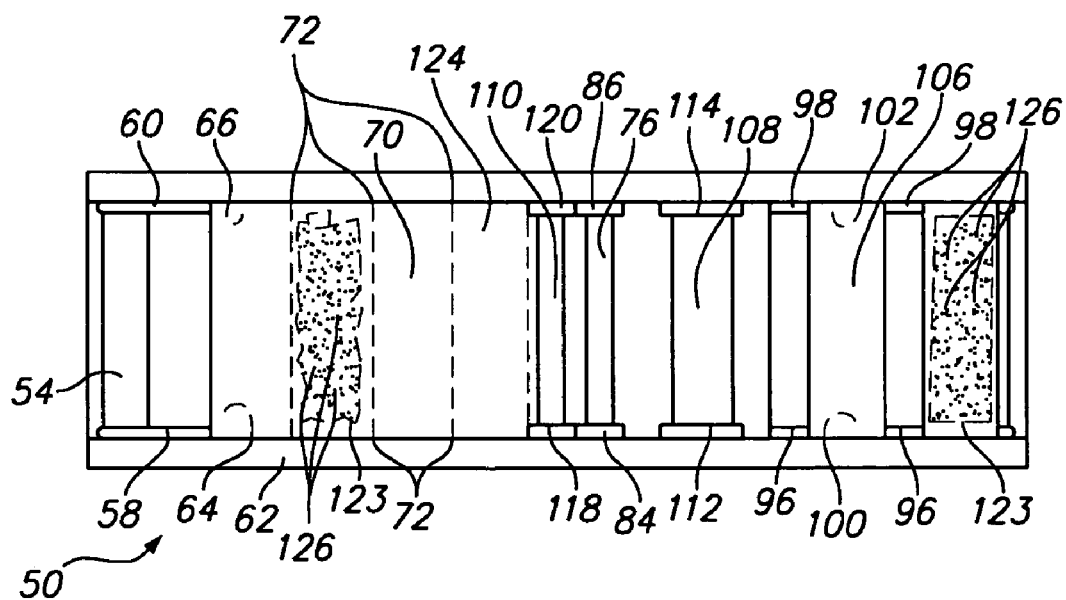
FIG. 2 is a schematic diagram depicting a side view of the apparatus of FIG. 1.

The operation of apparatus 50 will next be described with reference to FIGS. 1 and 2. Sheet of glass 70 has been previously scored to provide score lines 72 and also has been previously treated to create arrays of chemical compounds 126 on top surface 124 of sheet 70 in array areas 123. Sheet 70 is introduced on to belts 58 and 60 of input conveyor 52. As can be seen, the upper surface of belts 58 and 60 contact perimeter edges 64 and 66 on bottom surface 68 of sheet 70. Belts 58 and 60 are driven by the rotation of rollers 54 and 56 so that sheet 70 travels in the direction as indicated by the arrows in FIG. 1. As sheet 70 travels, it is engaged by drive roller 74 and pinch roller 76, whose speeds are matched to that of input conveyor 52. As indicated by the arrows in FIG. 1, the directions of rotation of drive roller 74 and pinch roller 76 are opposite to one another and cooperative with the direction of travel of input conveyor 52 to move sheet 70 toward output conveyor 90 and breaking roller 108. As indicated by the direction of the arrows in FIG. 1, output conveyor 90 and breaking roller 108 are moved in a direction that is cooperative with the direction of movement of sheet 70. Furthermore, the direction of rotation of breaking roller 108 is such that the end of sheet 70 is engaged by breaking roller 108. Output conveyor 90 is positioned at a level that is lower than that at which input conveyor 52 and the uppermost surface of drive roller 74 are positioned. Usually, the difference in the levels of the input and output conveyors is sufficient to achieve breaking of sheet 70 along score lines 72. As a result of the difference in levels, sheet 70 is urged downwardly when it contacts breaking roller 108. Sheet 70 is broken along score line 72 to produce single support 106, which travels along output conveyor 90 in the direction shown by the arrow in FIG. 1. Supports 106 separate because the speed of output conveyor 90 is greater than that of input conveyor 52 and drive roller 74 and pinch roller 76.

The breaking roller can be passive or active. If the roller is passive (allowed to freely rotate) it breaks the substrate material by forcing it down, thus, putting it in bending across the scribe line causing it to break on that scribe. If the breaking roller is active, it can be driven at a velocity such that the surface speed of its circumference is greater than the velocity of the substrate it contacts. If the contact area of breaking roller is made of a high friction material (such as an elastomeric material) the higher velocity roller will pull on the substrate forward as it contacts, putting tension as well as bending on it. This creates better breaks. These conditions also cause the singulated pieces to break away from substrate strip preventing collision of the broken edges, thus, preventing damage to those edges.

A portion of another embodiment of an apparatus in accordance with the present invention is depicted in FIG. 3. Apparatus 150 comprises input conveyor 152 comprising a pair of rollers 154 and 156 and conveyor belts 158 and 160. Rollers 154 and 156 are mounted on frame (not shown) by means of axle 155. As can be seen, conveyor belts 158 and 160 are designed so that each engages only respective perimeter edges 164 and 166 of bottom side 168 of sheet of glass 170 having a plurality of score lines 172. Apparatus 150 also comprises drive roller, which comprises a pair of axially spaced rollers 178 and 180 rotatably mounted on axle 182, which is also mounted on the frame. Apparatus 150 comprises conveyor guide air bearings 190 and 192, each having air supply tubes 194 and 196, respectively, which are in fluid communication with air sources (not shown). Apparatus 150 also comprises reaction air bearings 200 and 202, each having air supply tubes 204 and 206, which are in fluid communication with air sources (not shown). Apparatus 150 also comprises a mechanism for breaking sheet of glass 170 and for transporting pieces away from the breaking area (not shown). These breaking and transporting mechanisms may be of a form shown in FIGS. 1–2 or they may employ air bearing and other mechanisms as discussed herein.

Conveyor air bearing guide 190 is depicted in FIGS. 4A–4C. FIG. 4B shows conveyor belt guide grooves (with conveyor belt 158 removed for viewing) having a plurality of nozzles 191 for escape of air to impinge on the underside of conveyor belt 158. FIG. 4C shows internal distribution manifold 193 (with cover 195 removed).

FIGS. 5A and 5B depict reaction air bearing 200 having air supply tube 204, which is in fluid communication with an air source (not shown). Reaction air bearing 200 comprises manifold 206 and nozzles 208 for escape of air to impinge on the top side of substrate 170.

Another embodiment of an apparatus 250 in accordance with the present invention is depicted in FIGS. 6A–6C. Apparatus 250 is similar to apparatus 50 but employs a breaking lever 320 in place of a breaking roller. Breaking lever 320 comprises notch 324, which engages the tip of substrate glass 270. Breaking lever 320 is then rotated on pivot 326 in a counter clockwise direction, thus pushing substrate glass 270 in a downward direction. This results in the breaking of substrate glass 270 along score line 272. Apparatus 250 comprises input conveyor 252 comprising a pair of rollers 254 and 256 and a pair of conveyor belts 258 and 260 as well as support rollers 259. Apparatus 250 also comprises drive roller 274 and pinch roller 276. Apparatus 250 comprises output conveyor 290 comprising a pair of rollers 292 and 294 and conveyor belts 296 and 298 as well as support rollers 295.

The present apparatus and methods may be employed in the preparation of supports having a plurality of chemical compounds in the form of an array on the surface of such supports. The chemical compounds may be deposited on the surface of the support as fully formed moieties. On the other hand, the chemical compounds may be synthesized in situ in a series of steps such as, for example, the addition of building blocks, which are chemical components of the chemical compound. Examples of such building blocks are those found in the synthesis of polymers. The invention has particular application to chemical compounds that are biopolymers such as polynucleotides, for example, oligonucleotides.

The invention has particular application to supports bearing oligomers or polymers. The oligomer or polymer is a chemical entity that contains a plurality of monomers. It is generally accepted that the term "oligomers" is used to refer to a species of polymers. The terms "oligomer" and "polymer" may be used interchangeably herein. Polymers usually comprise at least two monomers. Oligomers generally comprise about 6 to about 20,000 monomers, preferably, about 10 to about 10,000, more preferably about 15 to about 4,000 monomers. Examples of polymers include polydeoxyribonucleotides, polyribonucleotides, other polynucleotides that are C-glycosides of a purine or pyrimidine base, or other modified polynucleotides, polypeptides, polysaccharides, and other chemical entities that contain repeating units of like chemical structure. Exemplary of oligomers are oligonucleotides and peptides.

A monomer is a chemical entity that can be covalently linked to one or more other such entities to form an oligomer or polymer. Examples of monomers include nucleotides, amino acids, saccharides, peptoids, and the like and subunits comprising nucleotides, amino acids, saccharides, peptoids and the like. The subunits may comprise all of the same component such as, for example, all of the same nucleotide or amino acid, or the subunit may comprise different components such as, for example, different nucleotides or different amino acids. The subunits may comprise about 2 to about 2000, or about 5 to about 200, monomer units. In general, the monomers have first and second sites (e.g., C-termini and N-termini, or 5' and 3' sites) suitable for binding of other like monomers by means of standard chemical reactions (e.g., condensation, nucleophilic displacement of a leaving group, or the like), and a diverse element that distinguishes a particular monomer from a different monomer of the same type (e.g., an amino acid side chain, a nucleotide base, etc.). The initial substrate-bound, or support-bound, monomer is generally used as a building block in a multi-step synthesis procedure to form a complete ligand, such as in the synthesis of oligonucleotides, oligopeptides, oligosaccharides, etc. and the like.

A biomonomer references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution).

A biopolymer is a polymer of one or more types of repeating units. Biopolymers are typically found in biological systems and particularly include polysaccharides (such as carbohydrates), and peptides (which term is used to include polypeptides, and proteins whether or not attached to a polysaccharide) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

Polynucleotides are compounds or compositions that are polymeric nucleotides or nucleic acid polymers. The polynucleotide may be a natural compound or a synthetic compound. Polynucleotides include oligonucleotides and are comprised of natural nucleotides such as ribonucleotides and deoxyribonucleotides and their derivatives although unnatural nucleotide mimetics such as 2'-modified nucleosides, peptide nucleic acids and oligomeric nucleoside phosphonates are also used. The polynucleotide can have from about 2 to 5,000,000 or more nucleotides. Usually, the oligonucleotides are at least about 2 nucleotides, usually, about 5 to about 100 nucleotides, more usually, about 10 to about 50 nucleotides, and may be about 15 to about 30 nucleotides, in length. Polynucleotides include single or multiple stranded configurations, where one or more of the strands may or may not be completely aligned with another.

A nucleotide refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides.

The nature of the support or substrate to which a plurality of chemical compounds is attached is discussed above. The support can be hydrophilic or capable of being rendered hydrophilic or it may be hydrophobic. The support is usually glass such as flat glass whose surface has been chemically activated for binding thereto or synthesis thereon, glass available as Bioglass and the like. The surface of a support is normally treated to create a primed or functionalized surface, that is, a surface that is able to support the attachment of a fully formed chemical compound or the synthetic steps involved in the production of the chemical compound on the surface of the support. Functionalization relates to modification of the surface of a support to provide a plurality of functional groups on the support surface. By the term "functionalized surface" is meant a support surface that has been modified so that a plurality of functional groups are present thereon usually at discrete sites on the surface. The manner of treatment is dependent on the nature of the chemical compound to be synthesized and on the nature of the support surface. In one approach a reactive hydrophilic site or reactive hydrophilic group is introduced onto the surface of the support. Such hydrophilic moieties can be used as the starting point in a synthetic organic process.

In one embodiment, the surface of the support, such as a glass support, is siliceous, i.e., the surface comprises silicon oxide groups, either present in the natural state, e.g., glass, silica, silicon with an oxide layer, etc., or introduced by techniques well known in the art. One technique for introducing siloxyl groups onto the surface involves reactive hydrophilic moieties on the surface. These moieties are typically epoxide groups, carboxyl groups, thiol groups, and/or substituted or unsubstituted amino groups as well as a functionality that may be used to introduce such a group such as, for example, an olefin that may be converted to a hydroxyl group by means well known in the art. One approach is disclosed in U.S. Pat. No. 5,474,796 (Brennan), the relevant portions of which are incorporated herein by reference. A siliceous surface may be used to form silyl linkages, i.e., linkages that involve silicon atoms. Usually, the silyl linkage involves a silicon-oxygen bond, a silicon-halogen bond, a silicon-nitrogen bond, or a silicon-carbon bond.

Another method for attachment is described in U.S. Pat. No. 6,219,674 (Fulcrand, et al.). A surface is employed that comprises a linking group consisting of a first portion comprising a hydrocarbon chain, optionally substituted, and a second portion comprising an alkylene oxide or an alkylene imine wherein the alkylene is optionally substituted. One end of the first portion is attached to the surface and one end of the second portion is attached to the other end of the first portion chain by means of an amine or an oxy functionality. The second portion terminates in an amine or a hydroxy functionality. The surface is reacted with the substance to be immobilized under conditions for attachment of the substance to the surface by means of the linking group.

Another method for attachment is described in U.S. Pat. No. 6,258,454 (Lefkowitz, et al.). A solid support having hydrophilic moieties on its surface is treated with a derivatizing composition containing a mixture of silanes. A first silane provides the desired reduction in surface energy, while the second silane enables functionalization with molecular moieties of interest, such as small molecules, initial monomers to be used in the solid phase synthesis of oligomers, or intact oligomers. Molecular moieties of interest may be attached through cleavable sites.

A procedure for the derivatization of a metal oxide surface uses an aminoalkyl silane derivative, e.g., trialkoxy 3-aminopropylsilane such as aminopropyltriethoxy silane (APS), 4-aminobutyltrimethoxysilane, 4-aminobutyltriethoxysilane, 2-aminoethyltriethoxysilane, and the like. APS reacts readily with the oxide and/or siloxyl groups on metal and silicon surfaces. APS provides primary amine groups that may be used to carry out the present methods. Such a derivatization procedure is described in EP 0 173 356 B1, the relevant portions of which are incorporated herein by reference. Other methods for treating the surface of a support will be suggested to those skilled in the art in view of the teaching herein.

The devices and methods of the present invention are particularly useful for the preparation of supports with array areas with array assemblies of biopolymers. An array includes any one-, two- or three-dimensional arrangement of addressable regions bearing a particular biopolymer such as polynucleotides, associated with that region. An array is addressable in that it has multiple regions of different moieties, for example, different polynucleotide sequences, such that a region or feature or spot of the array at a particular predetermined location or address on the array can detect a particular target molecule or class of target molecules although a feature may incidentally detect non-target molecules of that feature.

An array assembly on the surface of a support refers to one or more arrays disposed along a surface of an individual support and separated by inter-array areas. Normally, the surface of the support opposite the surface with the arrays (opposing surface) does not carry any arrays. The arrays can be designed for testing against any type of sample, whether a trial sample, a reference sample, a combination of the foregoing, or a known mixture of components such as polynucleotides, proteins, polysaccharides and the like (in which case the arrays may be composed of features carrying unknown sequences to be evaluated). The surface of the support may carry at least one, two, four, or at least ten, arrays. Depending upon intended use, any or all of the arrays may be the same or different from one another and each may contain multiple spots or features of chemical compounds such as, e.g., biopolymers in the form of polynucleotides or other biopolymer. A typical array may contain more than ten, more than one hundred, more than one thousand or ten thousand features, or even more than one hundred thousand features, in an area of less than 20 cm$^2$ or even less than 10 cm$^2$. For example, features may have widths (that is, diameter, for a round spot) in the range from a 10 µm to 1.0 cm. In other embodiments each feature may have a width in the range of 1.0 µm to 1.0 mm, usually 5.0 µm to 500 µm, and more usually 10 µm to 200 µm. Non-round features may have area ranges equivalent to that of circular features with the foregoing width (diameter) ranges.

Each feature, or element, within the molecular array is defined to be a small, regularly shaped region of the surface of the substrate. The features are arranged in a predetermined manner. Each feature of an array usually carries a predetermined chemical compound or mixtures thereof. Each feature within the molecular array may contain a different molecular species, and the molecular species within a given feature may differ from the molecular species within the remaining features of the molecular array. Some or all of the features may be of different compositions. Each array may contain multiple spots or features and each array may be separated by spaces or areas. It will also be appreciated that there need not be any space separating arrays from one another. Interarray areas and interfeature areas are usually present but are not essential. As with the border areas discussed above, these interarray and interfeature areas do not carry any chemical compound such as polynucleotide (or other biopolymer of a type of which the features are composed). Interarray areas and interfeature areas typically will be present where arrays are formed by the conventional in situ process or by deposition of previously obtained moieties, as described above, by depositing for each feature at least one droplet of reagent such as from a pulse jet (for example, an inkjet type head) but may not be present when, for example, photolithographic array fabrication processes are used. It will be appreciated though, that the interarray areas and interfeature areas, when present, could be of various sizes and configurations.

The devices and methods of the present invention are particularly useful in the preparation of individual supports with oligonucleotide arrays for determinations of polynucleotides. As explained briefly above, in the field of bioscience, arrays of oligonucleotide probes, fabricated or deposited on a surface of a support, are used to identify DNA sequences in cell matter. The arrays generally involve a surface containing a mosaic of different oligonucleotides or sample nucleic acid sequences or polynucleotides that are individually localized to discrete, known areas of the surface. In one approach, multiple identical arrays across a complete front surface of a single substrate or support are used.

As mentioned above, biopolymer arrays can be fabricated by depositing previously obtained biopolymers (such as from synthesis or natural sources) onto a substrate, or by in situ synthesis methods.

The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence is as follows: (a) coupling a selected nucleoside through a phosphite linkage to a functionalized support in the first iteration, or a nucleoside bound to the substrate (i.e. the nucleoside-modified substrate) in subsequent iterations; (b) optionally, but preferably, blocking unreacted hydroxyl groups on the substrate bound nucleoside; (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The functionalized support (in the first cycle) or deprotected coupled nucleoside (in subsequent cycles) provides a substrate bound moiety with a linking group for forming the phosphite linkage with a next nucleoside to be coupled in step (a). A number of reagents involved in the above synthetic steps such as, for example, phosphoramidite reagents, are sensitive to moisture and anhydrous conditions and solvents are employed. Final deprotection of nucleoside bases can be accomplished using alkaline conditions such as ammonium hydroxide, in a known manner.

The foregoing chemistry of the synthesis of polynucleotides is described in detail, for example, in Caruthers, *Science* 230: 281–285, 1985; Itakura, et al., *Ann. Rev. Biochem.* 53: 323–356; Hunkapillar, et al., *Nature* 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. Nos. 4,458,066, 4,500,707, 5,153,319, and 5,869,643, EP 0294196, and elsewhere.

As mentioned above, various ways may be employed to introduce the reagents for producing an array of polynucleotides on the surface of a support such as a glass support. Such methods are known in the art. One such method is discussed in U.S. Pat. No. 5,744,305 (Fodor, et al.) and involves solid phase chemistry, photolabile protecting groups and photolithography. Binary masking techniques are employed in one embodiment of the above. Arrays are fabricated in situ, adding one base pair at a time to a primer site. Photolithography is used to uncover sites, which are then exposed and reacted with one of the four base pair phosphoramidites. In photolithography the surface is first coated with a light-sensitive resist, exposed through a mask and the predetermined area is revealed by dissolving away the exposed or the unexposed resist and, subsequently, a surface layer. A separate mask is usually made for each predetermined area, which may involve one for each base pair in the length of the probe.

Another in situ method employs inkjet printing technology to dispense the appropriate phosphoramidite reagents and other reagents onto individual sites on a surface of a support. Oligonucleotides are synthesized on a surface of a substrate in situ using phosphoramidite chemistry. Solutions containing nucleotide monomers and other reagents as necessary such as an activator, e.g., tetrazole, are applied to the surface of a support by means of thermal ink-jet technology. Individual droplets of reagents are applied to reactive areas on the surface using, for example, a thermal inkjet type nozzle. The surface of the support may have an alkyl bromide trichlorosilane coating to which is attached polyethylene glycol to provide terminal hydroxyl groups. These hydroxyl groups provide for linking to a terminal primary amine group on a monomeric reagent. Excess of non-reacted chemical on the surface is washed away in a subsequent step. For example, see U.S. Pat. No. 5,700,637 and PCT WO 95/25116 and PCT application WO 89/10977.

Another approach for fabricating an array of biopolymers on a substrate using a biopolymer or biomonomer fluid and using a fluid dispensing head is described in U.S. Pat. No. 6,242,266 (Schleifer, et al.). The head has at least one jet that can dispense droplets onto a surface of a support. The jet includes a chamber with an orifice and an ejector, which, when activated, causes a droplet to be ejected from the orifice. Multiple droplets of the biopolymer or biomonomer fluid are dispensed from the head orifice so as to form an array of droplets on the surface of the substrate.

In another embodiment (U.S. Pat. No. 6,232,072) (Fisher) a method of, and apparatus for, fabricating a biopolymer array is disclosed. Droplets of fluid carrying the biopolymer or biomonomer are deposited onto a front side of a transparent substrate. Light is directed through the substrate from the front side, back through a substrate backside and a first set of deposited droplets on the first side to an image sensor.

An example of another method for chemical array fabrication is described in U.S. Pat. No. 6,180,351 (Cattell). The method includes receiving from a remote station information on a layout of the array and an associated first identifier. A local identifier is generated corresponding to the first identifier and associated array. The local identifier is shorter in length than the corresponding first identifier. The addressable array is fabricated on the substrate in accordance with the received layout information.

Other methods for synthesizing arrays of oligonucleotides on a surface include those disclosed by Gamble, et al., WO97/44134; Gamble, et al., WO98/10858; Baldeschwieler, et al., WO95/25116; Brown, et al., U.S. Pat. No. 5,807,522; and the like.

In accordance with the present invention and as described above, a sheet of glass, by way of illustration and not limitation, is first treated to form score lines on one of its surfaces. Next, arrays are formed on the surface of the sheet of glass in predetermined areas within the boundaries of the scored sections of the sheet of glass. Then, the sheet of glass is broken along the score lines to form individual supports in accordance with the present invention.

Supports comprising polynucleotide arrays may be provided in a number of different formats. In one format, the array is provided as part of a package in which the array itself is disposed on a first side of a glass or other transparent support. This support is fixed (such as by adhesive) to a housing with the array facing the interior of a chamber formed between the support and housing. An inlet and outlet may be provided to introduce and remove sample and wash liquids to and from the chamber during use of the array. The entire package may then be inserted into a laser scanner, and the sample-exposed array may be read through a second side of the support.

In another format, the array is present on an unmounted glass or other transparent slide support. This array is then exposed to a sample optionally using a temporary housing to form a chamber with the array substrate. The support may then be placed in a laser scanner to read the exposed array.

In another format the support is mounted on a support holder and retained thereon in a mounted position without the array contacting the holder. The holder is then inserted into an array reader and the array read. In one aspect of the above approach, the moieties may be on at least a portion of a rear surface of a transparent support, which is opposite a first portion on the front surface. In this format the support, when in the mounted position, has the exposed array facing a backer member of the holder without the array contacting the holder. The backer member is preferably has a very low in intrinsic fluorescence or is located far enough from the array to render any such fluorescence insignificant. Optionally, the array may be read through the front side of the support. The reading, for example, may include directing a light beam through the support from the front side and onto the array on the rear side. A resulting signal is detected from the array, which has passed from the rear side through the support and out the support front side. The holder may further include front and rear clamp sets, which can be moved apart to receive the support between the sets. In this case, the support is retained in the mounted position by the clamp sets being urged (such as resiliently, for example by one or more springs) against portions of the front and rear surfaces, respectively. The clamp sets may, for example, be urged against the support front and rear surfaces of a mounted support at positions adjacent a periphery of that slide. Alternatively, the array may be read on the front side when the support is positioned in the holder with the array facing forward (that is, away from the holder).

Regardless of the specific format, the above supports may be employed in various assays involving biopolymers. For example, following receipt by a user of an array made by an apparatus or method of the present invention, it will typically be exposed to a sample (for example, a fluorescent-labeled polynucleotide or protein containing sample) and the array is then read. Reading of the array may be accomplished by illuminating the array and reading the location and intensity of resulting fluorescence at each feature of the array. For example, a scanner may be used for this purpose where the scanner may be similar to, for example, the AGILENT MICROARRAY SCANNER available from Agilent Technologies Inc, Palo Alto, Calif. Other suitable apparatus and methods are described in U.S. patent applications: Ser. No. 09/846,125 "Reading Multi-Featured Arrays" by Dorsel, et al.; and Ser. No. 09/430,214 "Interrogating Multi-Featured Arrays" by Dorsel, et al. The relevant portions of these references are incorporated herein by reference. However, arrays may be read by methods or apparatus other than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,221,583 and elsewhere). Results from the reading may be raw results (such as fluorescence intensity readings for each feature in one or more color channels) or may be processed results such as obtained by rejecting a reading for a feature that is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing).

When one item is indicated as being "remote" from another, this is referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. An apparatus for cutting a sheet of material into single supports, each of said single supports having an array area to which is bound an array of chemical compounds, said sheet comprising a plurality of score lines, said apparatus comprising:
    (a) an input conveyor adapted to move said sheet without contacting said array area and an area on a surface of said support opposite said array area,
    (b) an output conveyor adapted to move said single supports without contacting said array area and an area on a surface of said support opposite said array area,
    (c) a driver adapted to move said sheet from said input conveyor to said output conveyor without contacting said array area and an area on a surface of said support opposite said array area, and
    (d) a breaking mechanism for breaking said sheet into said single supports along said score lines without contacting said array area and an area on a surface of said support opposite said array area.

2. An apparatus according to claim 1 wherein said input conveyor comprises a pair of belts that contact only opposing longitudinal perimeter edges of a surface of said sheet.

3. An apparatus according to claim 1 wherein said output conveyor comprises a pair of belts that contact only opposing longitudinal perimeter edges of said single supports.

4. An apparatus according to claim 1 wherein said input conveyor comprises air bearings for directing pressurized fluid at the underside of said input conveyer.

5. An apparatus according to claim 1 wherein said output conveyor comprises air bearings for directing pressurized fluid at the underside of said input conveyer.

6. An apparatus according to claim 1 wherein said driver comprises a driving roller.

7. An apparatus according to claim 6 wherein said driver further comprises a pinch roller.

8. An apparatus according to claim 1 wherein said mechanism for breaking said sheet comprises a pressure roller.

9. An apparatus according to claim 8 wherein said mechanism further comprises a reaction roller.

10. An apparatus according to claim 1 wherein said mechanism for breaking said sheet comprises a lever.

11. An apparatus according to claim 8 wherein said mechanism for breaking said sheet comprises air bearings to apply a pressurized fluid as a reaction force to said pressure roller.

12. An apparatus according to claim 1 wherein said input conveyor and said driver are adapted to move at substantially the same speed.

13. An apparatus according to claim 1 wherein said output conveyor is adapted to move said single supports away from said mechanism for breaking and separate said single supports from one another.

14. An apparatus for cutting a sheet of material into single supports, each of said single supports having an array area on a surface thereof to which array area is bound an array of biopolymers, said sheet comprising a plurality of score lines, said apparatus comprising:
 (a) an input conveyor comprising a pair of belts,
 (b) an output conveyor comprising a pair of belts,
 (c) a drive roller and a pinch roller that cooperate to move said sheet from said input conveyor to said output conveyor, and
 (d) a breaking roller and a reaction roller that cooperate to break said sheet along said score lines into said single supports,
wherein said input conveyor, said output conveyor, said drive roller, said pinch roller, said breaking roller and said reaction roller each contact only opposing longitudinal perimeter edges of a surface of said sheet and
wherein said output conveyor and said breaking roller each contact only opposing longitudinal perimeter edges of a surface of said single supports.

15. An apparatus according to claim 14 wherein said chemical compounds are biopolymers.

16. An apparatus according to claim 14 wherein said input conveyor, said drive roller and said pinch roller are adapted to move at substantially the same speed.

17. An apparatus according to claim 14 wherein said output conveyor and said input conveyor are adapted to move at different speeds wherein the speed of said output conveyor is greater than the speed of said input conveyor.

18. An apparatus according to claim 14 wherein said breaking roller and said drive roller are adapted to move at substantially the same speed.

19. An apparatus according to claim 14 wherein said breaking roller has a higher surface speed than said input conveyer.

20. An apparatus according to claim 14 said breaking roller is adapted to freely rotate.

21. An apparatus according to claim 14 wherein the horizontal axis of said output conveyor is disposed below the horizontal axis of said input conveyor.

22. An apparatus for cutting a sheet of material into single supports, each of said single supports having an array area to which is bound an array of chemical compounds, said sheet comprising a plurality of score lines, said apparatus comprising:
 (a) means for moving said sheet, without contacting said array area and an area on a surface of said support opposite said array area, into position for breaking said sheet along said score lines, and
 (b) means for breaking said sheets along said score lines to form said single supports without contacting said array area and an area on a surface of said support opposite said array area.

23. An apparatus according to claim 22 further comprising means for moving said single supports away from said position without contacting said array area and an area on a surface of said support opposite said array area.

24. An apparatus for cutting a sheet of material into single supports, each of said single supports having an array area to which is bound an array of chemical compounds, said sheet comprising a plurality of score lines, said apparatus comprising:
 (a) an input conveyor adapted to move said sheet without contacting said array area and an area on a surface of said support opposite said array area, said input conveyer comprising a pair of belts and comprising air bearings for directing pressurized fluid at the underside of said belts,
 (b) an output conveyor adapted to move said single supports without contacting said array area and an area on a surface of said support opposite said array area, said output conveyer comprising a pair of belts that contact only opposing longitudinal perimeter edges of a surface of said sheet and comprising air bearings for directing pressurized fluid at the underside of said belts,
 (c) a driver adapted to move said sheet from said input conveyor to said output conveyor without contacting said array area and an area on a surface of said support opposite said array area, and
 (d) a breaking mechanism for breaking said sheet into said single supports along said score lines without contacting said array area and an area on a surface of said support opposite said array area.

25. An apparatus according to claim 24 wherein said driver comprises a driving roller.

26. An apparatus according to claim 25 wherein said driver further comprises a pinch roller.

27. An apparatus according to claim 24 wherein said mechanism for breaking said sheet comprises a pressure roller.

28. An apparatus according to claim 27 wherein said mechanism further comprises a reaction roller.

29. An apparatus according to claim 24 wherein said mechanism for breaking said sheet comprises a lever.

30. An apparatus according to claim 27 wherein said mechanism for breaking said sheet comprises air bearings to apply a reaction force to said pressure roller.

31. An apparatus according to claim 24 wherein said input conveyor and said driver are adapted to move at substantially the same speed.

32. An apparatus according to claim 24 wherein said output conveyor is adapted to move said single supports away from said mechanism for breaking and separate said single supports from one another.

33. An apparatus for cutting a sheet of material into single supports, each of said single supports having an array area on a surface thereof to which array area is bound an array of biopolymers, said sheet comprising a plurality of score lines, said apparatus comprising:
  (a) an input conveyor comprising a pair of belts that contact only opposing longitudinal perimeter edges of a surface of said sheet,
  (b) an output conveyor comprising a pair of belts that contact only opposing longitudinal perimeter edges of a surface of said single support,
  (c) a drive roller and a pinch roller that cooperate to move said sheet from said input conveyor to said output conveyor and that contact only opposing longitudinal perimeter edges of a surface of said sheet, and
  (d) a breaking roller and air bearings to apply pressurized fluid as a reaction force to said breaking roller wherein said breaking roller and said air bearings cooperate to break said sheet along said score lines into said single supports and wherein said breaking roller contacts only opposing longitudinal perimeter edges of a surface of said sheet or of said single supports.

34. An apparatus according to claim 33 wherein said input conveyor, said drive roller and said pinch roller are adapted to move at substantially the same speed.

35. An apparatus according to claim 33 wherein said output conveyor and said input conveyor are adapted to move at different speeds wherein the speed of said output conveyor is greater than the speed of said input conveyor.

36. An apparatus according to claim 33 wherein said breaking roller and said drive roller are adapted to move at substantially the same speed.

37. An apparatus according to claim 33 wherein said breaking roller has a higher surface speed than said input conveyer.

38. An apparatus according to claim 33 said breaking roller is adapted to freely rotate.

39. An apparatus according to claim 33 wherein the horizontal axis of said output conveyor is disposed below the horizontal axis of said input conveyor.

40. An apparatus according to claim 33 wherein said input conveyor comprises air bearings for directing pressurized fluid at the underside of said belts of said input conveyer and wherein said output conveyor comprises air bearings for directing pressurized fluid at the underside of said belts of said output conveyor.

41. An apparatus for cutting a sheet of material into single supports, each of said single supports having an array area to which is bound an array of chemical compounds, said sheet comprising a plurality of score lines, said apparatus comprising:
  (a) an input conveyor adapted to move said sheet without contacting said array area and an area on a surface of said support opposite said array area, wherein said input conveyor comprises air bearings for directing pressurized fluid at the underside of said input conveyer,
  (b) an output conveyor adapted to move said single supports without contacting said array area and an area on a surface of said support opposite said array area,
  (c) a driver adapted to move said sheet from said input conveyor to said output conveyor without contacting said array area and an area on a surface of said support opposite said array area, and
  (d) a breaking mechanism for breaking said sheet into said single supports along said score lines without contacting said array area and an area on a surface of said support opposite said array area.

42. An apparatus according to claim 41 wherein said output conveyor comprises air bearings for directing pressurized fluid at the underside of said input conveyer.

* * * * *